(No Model.)
F. C. DAVIS.
DOUGH KNEADING OR MIXING DEVICE.
No. 437,099. Patented Sept. 23, 1890.
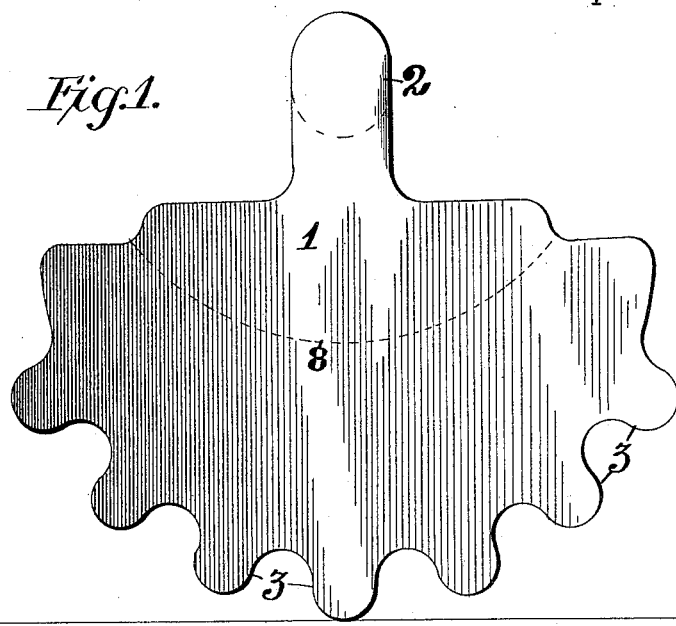
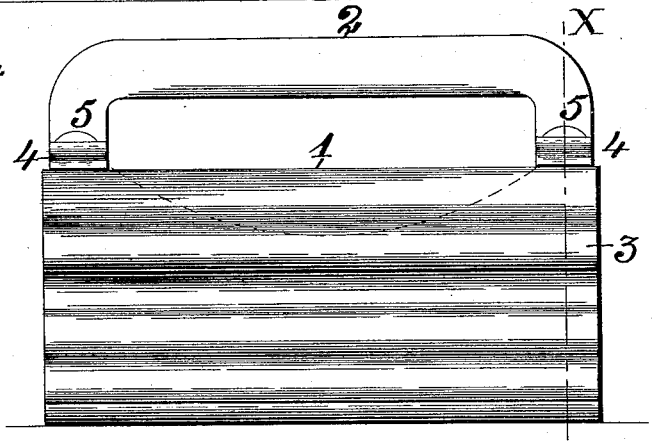
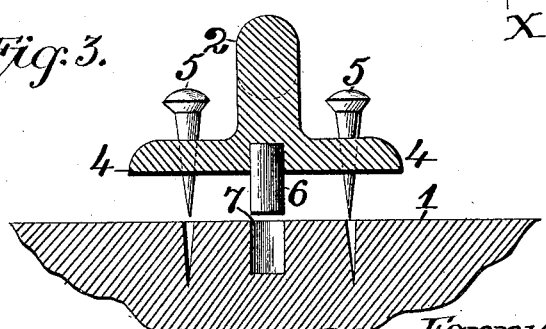
Witnesses
Inventor
Fanny C. Davis.
By her Attorneys

UNITED STATES PATENT OFFICE.

FANNY C. DAVIS, OF PANA, ILLINOIS.

DOUGH KNEADING OR MIXING DEVICE.

SPECIFICATION forming part of Letters Patent No. 437,099, dated September 23, 1890.

Application filed May 12, 1890. Serial No. 351,391. (No model.)

*To all whom it may concern:*

Be it known that I, FANNY C. DAVIS, of Pana, Christian county, Illinois, have invented certain new and useful Improvements in Dough Kneading or Mixing Devices, of which the following is a full, clear, and exact description, reference being had to the accompanying drawings, forming a part hereof.

My invention has for its object to provide a novel and simplified construction in dough-kneaders; and it consists in the novel combination and arrangement of parts, all of which will be hereinafter more fully set forth, and designated in the claim.

In the drawings, Figure 1 is a side elevation of my invention. Fig. 2 is a front elevation of a modification of my invention; and Fig. 3 is a cross-section taken on the line $xx$ of Fig. 2, showing means for attaching the handle.

Referring to the drawings by number, 1 represents a body of semicircular form, made, preferably, from a solid block of wood and having a handle 2 formed therewith and located upon the top or flat side of the said body.

3 represents a series of longitudinal corrugations formed upon the lower curved surface of the semicircular body 1, as better shown in Fig. 1.

The body 1 may be cored, as shown at 8, immediately below the handle 2, for the purpose of reducing the weight thereof, and, further, to allow sufficient space below the said handle, which would otherwise require a much higher one.

In the modification shown in Fig. 2 I have shown the body 1 and handle made of two parts and united together, as hereinafter described.

4 4 represent two arms formed with the handle 2 and projecting at right angles from each side thereof.

5 5 represent two screws or other like fastening devices, which pass through the arms 4 4 and are fastened in the body 1, by which means the handle 2 is securely fastened in the said body.

6 represents a dowel-pin fastened to the under side of the handle 2, and which is forced in a hole 7, formed in the body 1, as a further means of fastening the handle to the body.

The dough to be kneaded is first laid upon the molding-board and the kneader rocked back and forth upon it, folding the said dough as often as required to thoroughly knead the same.

In carrying out my invention it will be seen that the labor heretofore experienced is dispensed with and the dough kneaded in less time and with better results. It will also be seen that it can be made at a nominal cost, and by the simplicity of construction it can be easily kept clean.

I am aware that prior to my invention kneaders with corrugated under surfaces have been used; but such kneaders have been secured to suitable frame-works and have not been capable of a rocking motion, such as that hereinbefore mentioned, and I do not therefore desire to claim a corrugated kneader rigidly mounted, as before stated; but What I do desire to claim is—

A dough-kneader consisting of a semi-cylindrical body provided with corrugations upon its lower surface, and a handle secured to the said semi-cylindrical body and adapted to impart a rocking motion thereto, as described.

In testimony whereof I affix my signature in presence of two witnesses.

FANNY C. DAVIS.

Witnesses:
E. S. DAVIS,
G. I. LADD.